UNITED STATES PATENT OFFICE.

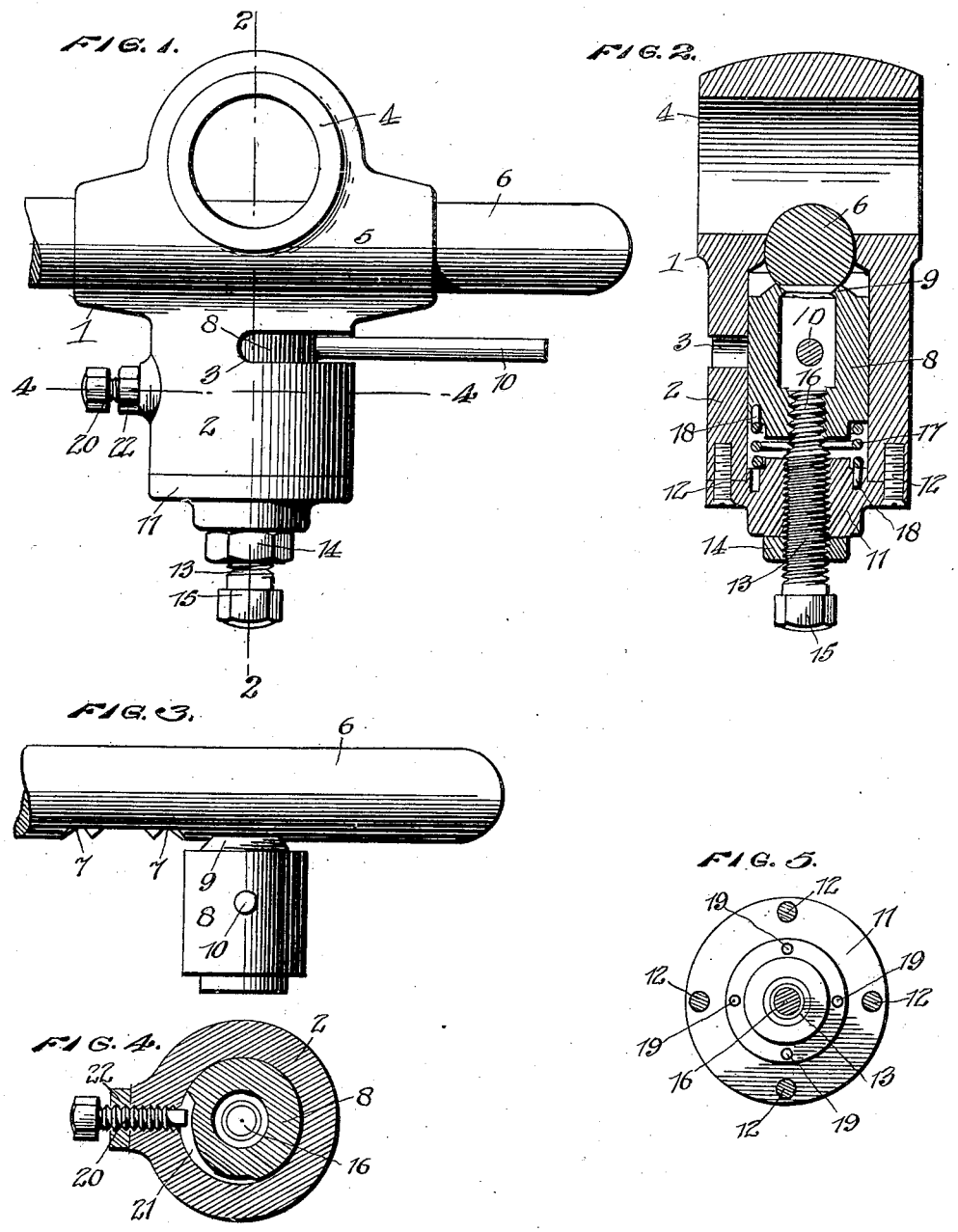

PAUL B. WOHLRAB, OF RACINE, WISCONSIN.

HOOK-LOCKING DEVICE.

No. 917,508.  Specification of Letters Patent.  Patented April 6, 1909.

Application filed May 18, 1908. Serial No. 433,622.

*To all whom it may concern:*

Be it known that I, PAUL B. WOHLRAB, a citizen of the United States, residing at Racine, in the county of Racine and State of Wisconsin, have invented certain new and useful Improvements in Automatic Hook-Locking Devices, of which the following is a specification.

My invention relates to an automatic hook locking device for use in connection with "Corliss" engines, and more particularly to a releasable connection between the hook rod and wrist plate of the valve gear thereof, which hook rod operates the said wrist plate from the rocker arm of the gear driven by the eccentric rod, and may be released from said wrist plate to allow the same to be operated by hand.

The object of my invention is to provide a locking device which will automatically engage the hook rod when released from the disengaged position, and one in which the mechanism will be simple, and effective in its operation.

Further objects and advantages will appear in the course of the following description, in which reference is made to the accompanying drawings, forming a part of this specification, in which like numerals are used to designate like parts throughout the several figures thereof, and in which, Figure 1 is a side elevation of my improved hook locking device, showing the same engaged with the hook rod. Fig. 2 is a vertical sectional view taken therethrough, on the line 2—2 of Fig. 1. Fig. 3 is a side elevation of the hook rod, showing the hook block removed and held adjacent said hook rod in disengaged relation. Fig. 4 is a horizontal sectional view taken through my improved device on the line 4—4 of Fig. 1, and Fig. 5 is a plan view of the hook cap.

In the practical embodiment of my invention, I provide a hook 1, which may be of any of the well known type, embodying a depending tubular casing 2, constituting the barrel thereof, and provided with a slotted opening 3, extending transversely thereof, and partially therearound. In the present instance, the hook 1 is illustrated as comprising an upper apertured bearing 4, through which the hook pin, connecting said hook with the wrist plate, is secured, and provided further with a second apertured bearing 5, extending therethrough below said bearing 4, and transversely thereof, said bearing 5 having communication with the bore of the barrel 2, and being adapted for the reception of the rod 6, slidably therethrough, said hook rod having a pair of spaced curved transverse notches 7, by which the same is locked from movement within said bearing 5.

Mounted to slide and rotate within the bore of the barrel 2, is a hook block 8, having a curved projection 9 upon its upper end corresponding to and adapted for engagement within the notches 7 of the hook rod 6. The said hook block 8 is provided with an extending handle 10, projecting outwardly through the slotted opening 3, of the said barrel and having movement in a horizontal plane between the ends of said slot to rotate said hook block 8 and capable of slight vertical movement to allow for the movement of the said hook block toward and from the said hook rod 6. A circular cap 11 closes the lower end of the barrel 2, and is secured thereto by screws 12, said cap having a centrally threaded opening for the reception of the threaded adjusting screw 13, projecting upwardly therethrough and locked in connection therewith when necessary by an external locking nut 14, said adjusting screw 13, having an enlarged external head 15, and a reduced inner end 16, threaded and engaging within a centrally threaded opening in the lower portion of the hook block 8. The reduced inner end 16, is, as shown, provided with threads of much coarser pitch than the threads of the body portion of said adjusting screw, which engage through the cap 11. Thus, if the adjusting screw 13 was rotated to the left, in Fig. 2, and the hook block 8 prevented from rotation by holding its handle 10, the said hook block would be forced upwardly into tighter engagement with the hook rod 6. Extending between the hook block 8, and the cap 11, and surrounding the adjusting screw 13, is a coil spring 17, having angular ends 18 for engagement within openings in said hook block and said cap, whereby the rotation of the hook block 8, by its handle 10, to disengage its projections 9 from the notches 7 of the rod 6, will be under tension of the said spring 17, which will cause the reëngagement of said projections 9 and notches 7 when said handle is released. The aforesaid openings in the cap 11 are arranged in a circular series and designated at 19 in Fig. 5, whereby the tension of the said coil spring 17, when in position, may be regulated by the engagement of its lower angular end 18 with a selected one of said openings 19 in said cap.

The barrel 2, is provided with a threaded opening extending through the wall and communicating with the bore thereof, which opening is adapted for the reception of a set screw 20 having a reduced inner end for engagement within a circularly extending cut out portion 21 in the periphery of the hook block 8, which cut out portion tapers from a relatively deep end to a relatively shallow end and in the direction of movement of the said hook block by the handle 10. Thus, if the set screw 20 is rotated to project well within the deepened end of the cut out portion 21, as shown in Fig. 4, and secured therein by its external lock nut 22, the said inner end of said set screw will tightly engage within the shallow end of said cut out portion 21 when said hook block 8 is rotated by means of its handle 10, in order to hold the said hook block in the disengaged position. Thus, when the hook block 8 has been rotated by its handle 10 to the disengaged position, and held in such position as just described, by means of the relatively engaging set screw 20 and cut out portion 21, it is only necessary to rotate said set screw to withdraw the same slightly and allow the coil spring 17 to automatically rotate the hook block 8 upon the reduced end 16 of the adjusting screw 13, and forwardly against the hook rod 6 to reëngage the projections 9 thereof with the notches 7 of said rod.

Having fully described my invention, I claim:

1. In an automatic hook locking device, the combination with the hook rod and the hook having a bore through which said rod loosely passes, and provided with a barrel communicating with said bore, of a hook block mounted to slide and rotate within said barrel, and provided with means to lockingly engage said rod, means upon which said block is swiveled adapted to move the same toward and away from said rod when said block is rotated, manually operated means to rotate said block to release said rod, and means to automatically rotate said block into engagement with said rod when said manually operated means are released, substantially as described.

2. In an automatic hook locking device, the combination with the hook rod, and the hook having a bore through which said rod loosely passes, and provided with a barrel communicating with said bore, of a hook block mounted to slide and rotate within said barrel and provided with means to lockingly engage said rod, an operating lever for rotating said block to release said hook rod, means to hold said block in the released position, said means being adjustable to release said block, and means to automatically project said block into engagement with said rod when so released, substantially as described.

3. In an automatic hook locking device, the combination with the hook rod, and the hook having a bore through which said rod loosely passes, and provided with a barrel communicating with said bore, of a hook block mounted to slide and rotate within said barrel and provided with means to lockingly engage said rod, an operating lever for rotating said block to release said hook rod, means upon which said block is swiveled adapted to move the same toward and away from said rod during its rotation, means to hold said block in the disengaged position, said means being adjustable to release said block, spring means for automatically rotating said block into engagement with said rod when so released, and means whereby the tension of said spring means may be regulated, substantially as described.

In testimony whereof I affix my signature in presence of two witnesses.

PAUL B. WOHLRAB.

Witnesses:
ALWINE SCHLEGEL,
L. SCHLEGEL, Sr.